United States Patent Office 3,053,835
Patented Sept. 11, 1962

3,053,835
PROCESS FOR 17α,21-STEROID OXIDES
Janos Kollonitsch, Westfield, and Leonard M. Weinstock, Highland Park, N.J., assignors to Merck & Co., Inc., Rahway, N.J., a corporation of New Jersey
No Drawing. Filed May 8, 1961, Ser. No. 108,319
10 Claims. (Cl 260—239.55)

This invention relates to a process of preparing new steroid compounds. More specifically, this invention relates to a process of preparing the 17α,21-oxide of a 17, 21-hydroxy-20-ketopregnane steroid which comprises effecting a mixture of the corresponding 17α,21-dihydroxy-20-ketopregnane steroid 21-mesylate with a tetraalkyl ammonium fluoride in an inert solvent.

Some pregnane 17α,21-oxides have been reported in the literature. They have been prepared by the reaction of 21-iodo pregnanes with silver phosphate. This is a process which gives poor yields. Pregnane-17α,21-oxides have also been encountered as a by-product in the reaction of 21-iodo pregnanes with silver fluoride or of the 21-mesylate with potassium fluoride.

We have found a new process for the preparation of pregnane-17α,21-oxides which comprises the preparation of the 21 mesylate and its reaction with a tetra-alkyl ammonium fluoride in an inert solvent. We have found that such a process gives good yields of the 21-oxides. At least some of these compounds are more active anti-inflammatory compounds with lower side effects such as appetite stimulation.

The starting materials for the process of our invention comprise any 17α-hydroxy-21-hydroxy-20-pregnane steroid. Thus, they may include 17α,21-dihydroxy-pregna-3,20-dione;
3,17α,21-trihydroxy-20-pregnane;
17α,21-dihydroxy-4-pregnene-3,20-dione;
17α,21-dihydroxy-1,4-pregnadiene-3,20-dione;
11β,17α,21-trihydroxy-1,4-pregnadiene-3,20-dione;
11β,17α,21-trihydroxy-4-pregnene-3,20-dione;
11β,17α,21-trihydroxy-1,4-pregnadiene-3,20-dione;
17α,21-dihydroxy-4-pregnene-3,11,20-trione;
17α,21-dihydroxy-1,4-pregnadiene-3,11,20-trione;
9α-fluoro-17α,21-dihydroxy-1,4-pregnadiene-3,11,20-trione;
9α-bromo-17α,21-dihydroxy-1,4-pregnadiene-3,11,20-trione;
9α-chloro-17α,21-dihydroxy-1,4-pregnadiene-3,11,20-trione.

In the process of our invention, the 21-mesylate of the steroid is prepared by reaction with methane sulfonyl chloride in an organic base such as pyridine, picoline, dimethylaniline and the like. The 21-mesylate is then reacted with a tetra-alkyl ammonium fluoride to form the 17α, 21-oxide. The solvents which may be used in this reaction include acetonitrile, nitromethane, dimethyl-sulfoxide, acetone and any other polar solvent which will dissolve both the quaternary salt and the mesylate. We prefer to use acetonitrile.

The tetra-alkyl ammonium fluoride may be any lower alkyl ammonium fluoride such as tetramethyl ammonium fluoride, tetraethyl-methyl ammonium fluoride, trimethyl-ethyl ammonium fluoride, diethyl-dibutyl ammonium fluoride, tetrapropyl ammonium fluoride, tetrabutyl ammonium fluoride and the like. Usually, one prefers to use tetraethyl ammonium fluoride. The reaction is usually run at room temperature. It can be run at any temperature from 0° up to 100° C. but those below 50° C., especially ambient temperatures are preferred.

In the isolation of the product, water is added and the product is isolated by filtration. In the cases where a solvent is used which is not water-soluble, the solvent is removed by distillation under reduced pressure and the product is slurried in water and filtered. The crude product is purified by chromatography over alumina using a 50% chloroform ether mixture for elution.

Some of the oxides which can be prepared by our process have more active anti-inflammatory properties with less side effects than those previously known. They are claimed elsewhere by our associates. These oxides have the formula

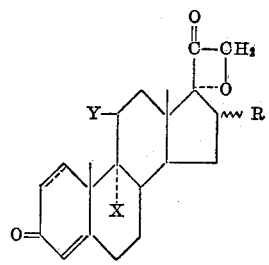

in which R is alkyl, X may be hydrogen or halogen, Y may be hydrogen, X being halogen only when Y is other than hydrogen, keto oxygen or β-hydroxyl, ring A may be a Δ4 or a Δ1,4 structure and the 16 substituent may be α or β. The starting materials are the corresponding 17α, 21-dihydroxy compounds, most of which are known. The 16α and β-methyl derivatives of these structures are described in the literature. The higher β-alkyl compounds are readily prepared using higher diazoalkanes in place of diazomethane in the key step of the synthesis. Similarly, the higher α-alkyl compounds are prepared by the use of the corresponding alkyl Grignard reagent.

Our invention can be illustrated by the following examples:

Example 1

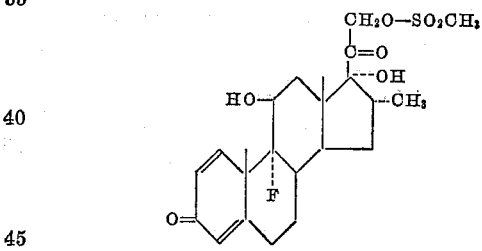

To a solution of 85 mg. of 9α-fluoro-16α-methyl 11β, 17α,21-trihydroxy-1,4-pregnadiene-3,20-dione in 0.5 ml. of pyridine is added 0.03 ml. of methane-sulfonyl chloride. The resulting mixture is allowed to stand at 0° for a period of approximately one hour. Water is then added to the reaction mixture and the precipitate of the corresponding 21-mesylate which forms is removed by filtration, washed with water and dried.

Example 2

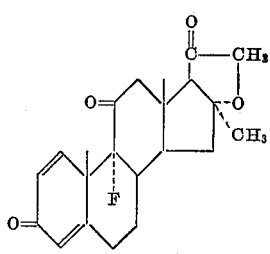

A solution of 350 mg. of the 21-mesylate of 9α-fluoro-16α-methyl - 11β,17α,21-trihydroxy-1,4-pregnadiene-3,20-dione in 3 ml. of acetonitrile and a solution of 350 mg. of tetraethylammonium fluoride in 4 ml. of acetonitrile are combined and allowed to stand at room temperature. After 50 minutes, 50 ml. of cold water is added. The crystalline product which separates is collected by filtra-

Example 3

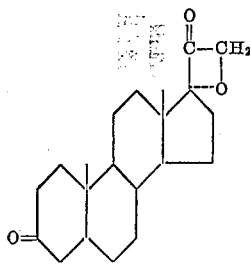

The procedures of Examples 1 and 2 are followed using as the starting material 17α,21-dihydroxy-pregnane-3,20-dione in equivalent quantities to yield the corresponding 17α,21-oxide. Similarly, when the procedures of Examples 1 and 2 are followed using as the starting material an equivalent quantity of 3,17α,21-trihydroxy-pregnane-20-one;
17α,21-dihydroxy-4-pregnene-3,20-dione;
17α,21-dihydroxy-1,4-pregnadiene-3,20-dione;
11β,17α,21-trihydroxy-4-pregnene-3,20-dione;
11β,17α,21-trihydroxy-1,4-pregnadiene-3,20-dione;
17α,21-dihydroxy-4-pregnene-3,11,20-trione;
17α,21-dihydroxy-1,4-pregnadiene-3,11,20-trione;
9α-fluoro-17α,21-dihydroxy-1,4-pregnadiene-3,11,20-trione;
9α-bromo-17α,21-dihydroxy-1,4-pregnadiene-3,11,20-trione;
or
9α-chloro-17α,21-dihydroxy-1,4-pregnadiene-3,11,20-trione, the corresponding 17α,21-oxide is obtained.

We claim:

1. The process of preparing the 17α,21-oxide of a 21-hydroxy-pregnane-20-one steroid which comprises effecting a mixture of the corresponding 17α,21-dihydroxy-pregnane-20-one steroid 21-mesylate with a tetra-lower-alkyl ammonium fluoride in an inert polar solvent for both reactants.

2. A process of preparing compounds of the formula

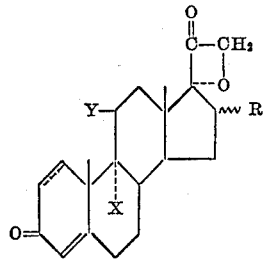

in which R is alkyl, X is selected from the group consisting of hydrogen and halogen, Y is selected from the group consisting of hydrogen, keto oxygen and β-hydroxyl, X being halogen only when Y is other than hydrogen, the dotted line in ring A indicates the $C_1$–$C_2$ bond is selected from the group consisting of single and double bonds and the wavy line at the $C_{16}$ substituent indicates selection from the group consisting of α and β bonds, which comprises effecting a mixture of a compound of the structure

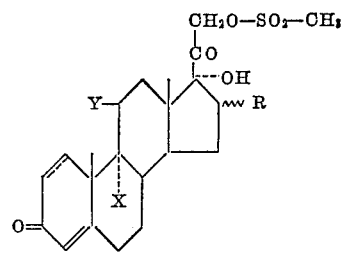

with a tetra-lower-alkyl ammonium fluoride in an inert polar solvent for both reactants at temperatures from 0° to 100° C.

3. The process of claim 1 in which Y is keto, X is fluoro, the $C_1$–$C_2$ bond is double and the alkyl group at $C_{16}$ is a β-methyl.

4. The process of claim 1 in which Y is keto, X is fluoro, the $C_1$–$C_2$ bond is double and the alkyl group at $C_{16}$ is an α-methyl.

5. The process of claim 1 in which Y is keto, X is fluoro, the $C_1$–$C_2$ bond is single and the $C_{16}$ substituent is α-methyl.

6. The process of claim 1 in which Y is keto, X is fluoro, the $C_1$–$C_2$ bond is single and the $C_{16}$ substituent is β-methyl.

7. The process of claim 1 in which Y is β-hydroxyl, X is fluoro, the $C_1$–$C_2$ bond is double and the alkyl group at $C_{16}$ is α-methyl.

8. The process of claim 1 in which Y is β-hydroxyl, X is fluoro, the $C_1$–$C_2$ bond is double and the alkyl group at $C_{16}$ is β-methyl.

9. The process of claim 1 in which Y is β-hydroxyl, X is fluoro, the $C_1$–$C_2$ bond is single and the $C_{16}$ substituent is α-methyl.

10. The process of claim 1 in which Y is β-hydroxyl, X is fluoro, the $C_1$–$C_2$ bond is single and the $C_{16}$ substituent is β-methyl.

References Cited in the file of this patent

UNITED STATES PATENTS

| | | |
|---|---|---|
| 2,884,421 | Magerlein et al. | Apr. 28, 1959 |
| 2,903,449 | Fried et al. | Sept. 8, 1959 |